(12) United States Patent
Watanabe et al.

(10) Patent No.: US 7,056,153 B2
(45) Date of Patent: Jun. 6, 2006

(54) CONNECTOR FOR MEMORY CARD AND MOBILE PHONE WITH THE CONNECTOR

(75) Inventors: Satoru Watanabe, Osaka (JP); Yuichi Konishi, Osaka (JP)

(73) Assignee: J.S.T. Mfg. Co., Ltd., Osaka (JP)

( * ) Notice: Subject to any disclaimer, the term of this patent is extended or adjusted under 35 U.S.C. 154(b) by 0 days.

(21) Appl. No.: 10/515,048

(22) PCT Filed: May 30, 2003

(86) PCT No.: PCT/JP03/06803

§ 371 (c)(1),
(2), (4) Date: Nov. 19, 2004

(87) PCT Pub. No.: WO03/103096

PCT Pub. Date: Dec. 11, 2003

(65) Prior Publication Data

US 2005/0239333 A1    Oct. 27, 2005

(30) Foreign Application Priority Data

May 31, 2002    (JP) .............................. 2002-159034

(51) Int. Cl.
*H01R 24/00* (2006.01)
(52) U.S. Cl. .................. 439/630; 439/159; 439/328
(58) Field of Classification Search ........... 439/630, 439/363, 570, 62, 157, 325–329, 152–160, 439/188; 361/801–802, 740, 748, 756, 759, 361/747, 737
See application file for complete search history.

(56) References Cited

U.S. PATENT DOCUMENTS

| | | | | |
|---|---|---|---|---|
| 5,275,573 A | * | 1/1994 | McCleerey | 439/159 |
| 6,231,364 B1 | * | 5/2001 | Liu | 439/326 |
| 6,478,590 B1 | * | 11/2002 | Kuo | 439/159 |
| 6,478,592 B1 | * | 11/2002 | Hu et al. | 439/159 |
| 6,805,566 B1 | * | 10/2004 | Chia-Chen | 439/188 |

FOREIGN PATENT DOCUMENTS

| | | |
|---|---|---|
| JP | 8-236215 A | 9/1996 |
| JP | 10-294147 A | 11/1998 |
| JP | 2002-280098 A | 9/2002 |
| WO | WO01/22345 A1 | 3/2001 |

* cited by examiner

Primary Examiner—Gary F. Paumen
Assistant Examiner—Edwin A. Leon
(74) Attorney, Agent, or Firm—Osha-Liang LLP

(57) ABSTRACT

The present invention is intended to detachably retain a memory card (1) and connect a terminal formed on a terminal surface (1a) of the memory card (1) to the terminal on a substrate (21) so as to be capable of data exchange. There are provided a housing (2) having a terminal surface abutting portion (3) to be abutted to the terminal surface (1a) of the memory card (1) and guiding walls (4), (4) extending upward from lateral ends of the terminal surface abutting portion (3) for laterally positioning the memory card (1); and tabs (10) having resilient supporting strips (12), (12) on top and bottom and being attached to the respective guiding walls (4) by being fitted from the outside so as to clamp the tops and bottoms of the guiding walls (4), (4) for pushing the lateral ends of the memory card (1) against the terminal surface abutting portion (3) by the supporting strips (12).

8 Claims, 5 Drawing Sheets

CONNECTOR FOR MEMORY CARD AND MOBILE PHONE WITH THE CONNECTOR

BACKGROUND OF INVENTION

1. Field of the Invention

The present invention relates to a memory card connector for connecting a terminal of a memory card to a terminal on a substrate so as to be capable of data exchange.

2. Background Art

For example, since a mobile phone is to be used by registering personal information such as telephone numbers, it is desired that registered personal information can be transferred easily from an old machine to a new machine when upgrading to the new machine. Therefore, in recent years, a memory card connecter is soldered to a substrate integrated in the mobile phone, and the memory card for storing personal information is detachably attached to the connector. When the mobile phone is upgraded, the memory card is pulled out from the connector and is attached to the connector of the new machine for transferring personal information.

The memory card connector is desired to be able to retain the memory card firmly and allow the memory card to be attached and detached easily. Therefore, the memory card connector in the related art is provided with a housing having fitting holes at both ends and tabs substantially fitted into these fitting holes and had insertion strips that formed with projections at both ends. Then, the memory card connector is formed by inserting the insertion strips into the fitting holes on the housing, and attaching the tabs to the housing.

However, in the structure in which the insertion strips of the tabs are inserted into the fitting holes of the housing for assembly as in the related art, since the projections on the insertion strips are wider than the fitting holes of the housing, it is necessary to insert the tabs with a jig or the like with a strong force while deforming the housing. Consequently, the production cost is increased by introduction of the jig, and the assembly processes increase by a step of using the jig. Therefore, there arises a problem that the burden of the operator increases, and hence production efficiency is lowered.

Accordingly, it is an object of the present invention to provide a memory card connector in which the burden of the operator can be alleviated by reducing the production cost required for introducing the jig and the operating processes, and hence the production efficiency can be improved.

SUMMARY OF INVENTION

The present invention provides a memory card connector for detachably retaining a memory card and allowing a terminal formed on a terminal surface of the memory card to be connected to the terminal on a substrate so as to be capable of data exchange including: a housing having a terminal surface abutting portion to be abutted to the terminal surface of the memory card and guiding walls extending upward from lateral ends of the terminal surface abutting portion for laterally positioning the memory card; and tabs having resilient supporting strips on top and bottom and being attached to the respective guiding walls by being fitted from the outside so as to clamp the tops and bottoms of the guiding walls by these supporting strips for pushing the lateral ends of the memory card against the terminal surface abutting portion by the supporting strips.

In this arrangement, when attaching the tab by fitting it from the outside of the guiding wall, it is necessary to open the supporting strips disposed on top and bottom of the tab forcibly upward and downward by allowing them to abut against the guiding wall. However, since the supporting strips have resiliency, an operator can fit the tab easily to the state in which the supporting strips clamp the guiding wall by pushing the tab toward the guiding wall. Therefore, it is no longer necessary to use a jig which presses the tab with a large force as in the case of fitting the same by forcibly deforming the housing as in the related art. Accordingly, the production cost required for introducing the jig can be reduced, and the steps required for using the jig can be eliminated. As a consequence, the burden of the operator can be alleviated, and the production efficiency can be improved.

In the present invention, the ends of the supporting strips are inclined from the proximal side to the free end so as to be reduced in length.

In this arrangement, when attaching the memory card to the memory card connector, the free ends of the supporting strips come near the terminal surface abutting portion, whereby the memory card can be inserted by inserting the end thereof through a larger clearance formed on the proximal side of the supporting strips even when the distance between the free ends of the supporting strips and the terminal surface abutting portion of the housing is smaller than the thickness of the memory card. Accordingly, the memory card can easily be attached to the memory card connector.

In the present invention, the tab is formed so that the supporting strips are symmetrical top and bottom.

In this arrangement, since the tab can be attached upside down, handling of the tab is facilitated, and the burden of the operator can further be alleviated.

In the present invention, the outer surfaces of the supporting strips of the tab, which is located on the lower side of the guiding wall, are fixed to the substrate by soldering. In this arrangement, the connector can be fixed firmly to the substrate.

In the present invention, the outer surfaces of the supporting strips of the tab are formed with mesh patterns. In this arrangement, since the surface area of the outer surfaces of the supporting strip can be increased by the mesh patterns, fixation of the connector with respect to the substrate by soldering can further be strengthened.

In the present invention, since the tab has a locking window opening from the upper supporting strip to the lower supporting strip, and the guiding wall has a locking member formed so that the top and bottom portions are situated upwardly of the upper supporting strip and downwardly of the lower supporting strip in the locking window, respectively.

In this arrangement, the tab is prevented from dropping off the housing by the top and bottom portions of the locking member being abutted against the upper and lower supporting strips respectively.

In the present invention, the locking member is provided with bevels inclining from the outer surface toward the top and bottom portions. In this arrangement, since the supporting strips of the tab open along the bevels, the tab can easily be attached to the housing.

In the present invention, the locking members are arranged side-by-side at a plurality of positions, and the supporting strips are formed with projections for clamping the guiding wall between the locking members on the sides of locking window thereof.

In this arrangement, even when the shape-retaining property of the supporting strip is lowered by the formation of the locking window, the lowering of the shape-retaining property can be minimized by clamping the top and bottom of the guiding wall with the projection.

The present invention is a mobile phone provided with the memory card connector having the structure as described above. Accordingly, even when the memory card connector is provided within an enclosure of the mobile phone, and attachment or detachment thereof must be done from obliquely upward, attachment or detachment can be done easily. In addition, even when an irregular separating force is generated for the memory card connector during attaching or detaching operation, the memory card connector can hardly be separated from the substrate. Consequently, upgrading of the mobile phone can be done easily and safely.

DETAILED DESCRIPTION

Figure 1:
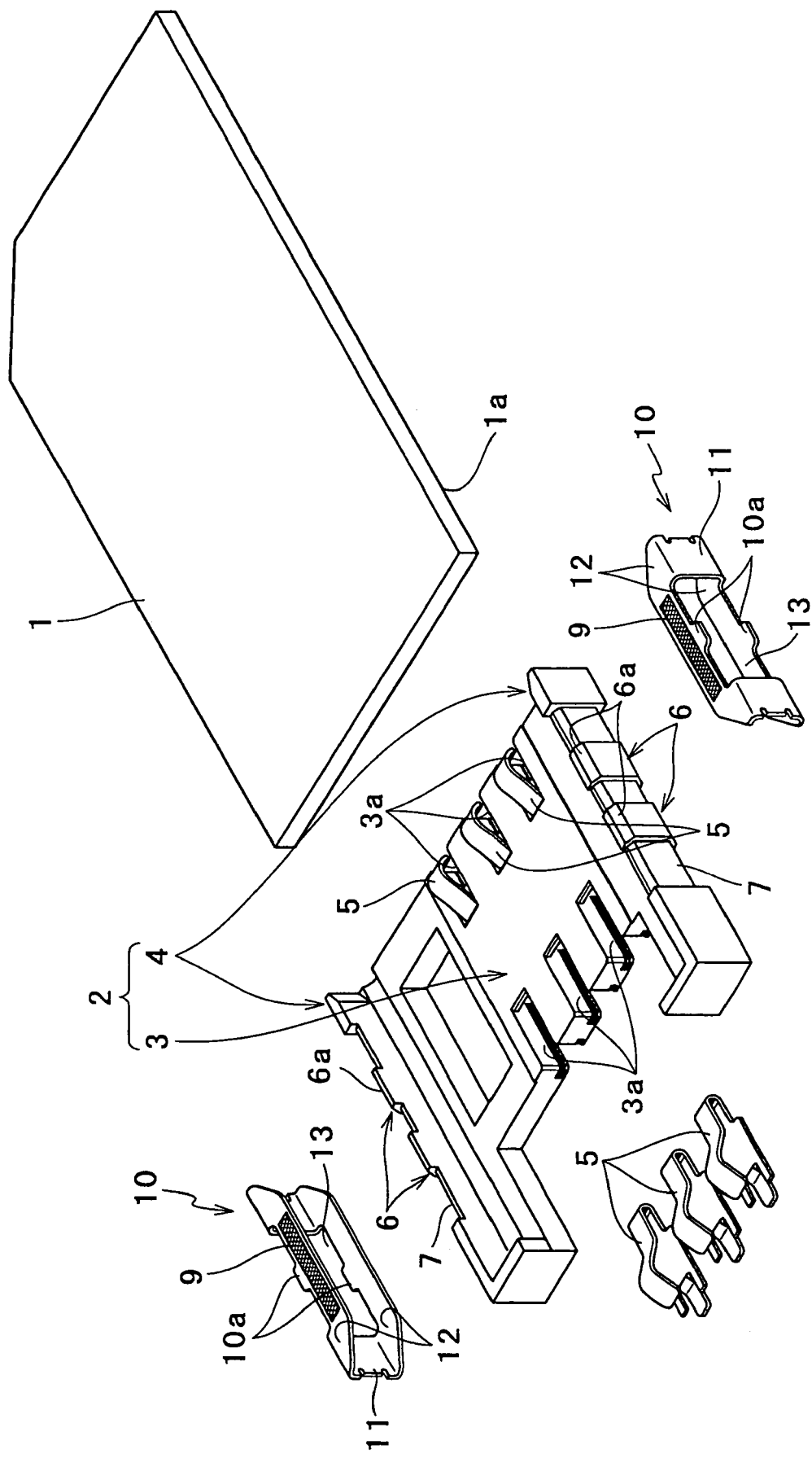
FIG. 1 is an explanatory drawing showing assembly processes of a memory card connector.
Figure 2:
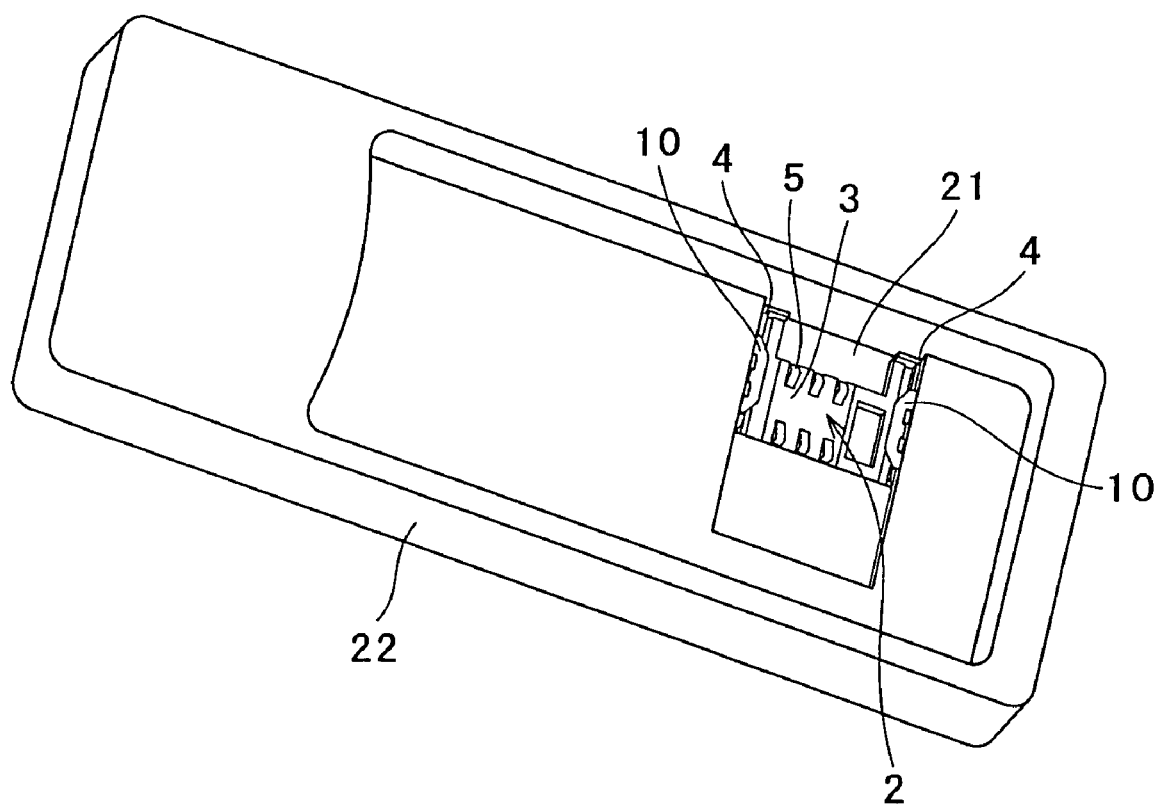
FIG. 2 is an explanatory drawing showing the state in which the memory card connector is mounted to a mobile phone.
Figure 3:
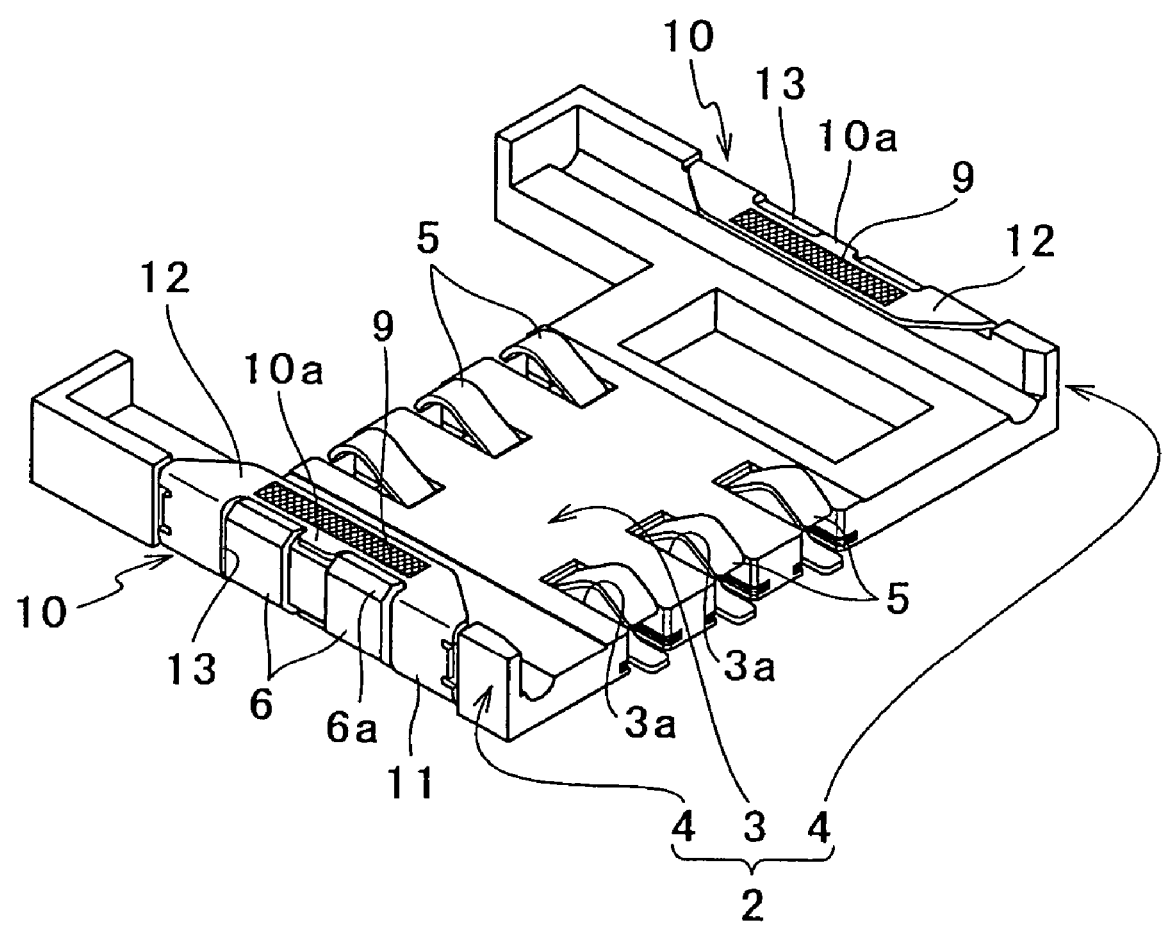
FIG. 3 is a perspective view of the memory card connector.
Figure 4:
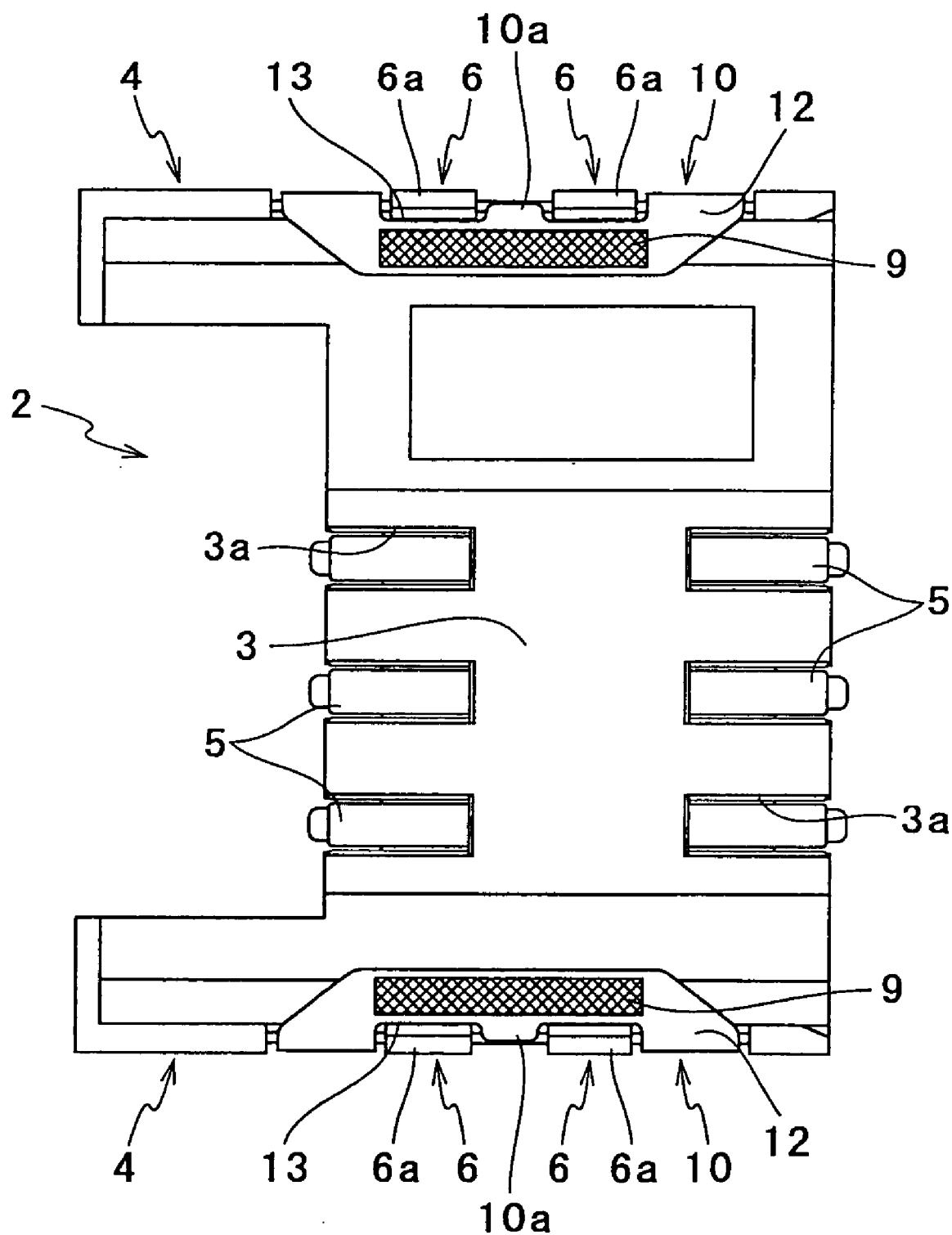
FIG. 4 is a front view of the memory card connector.
Figure 5:
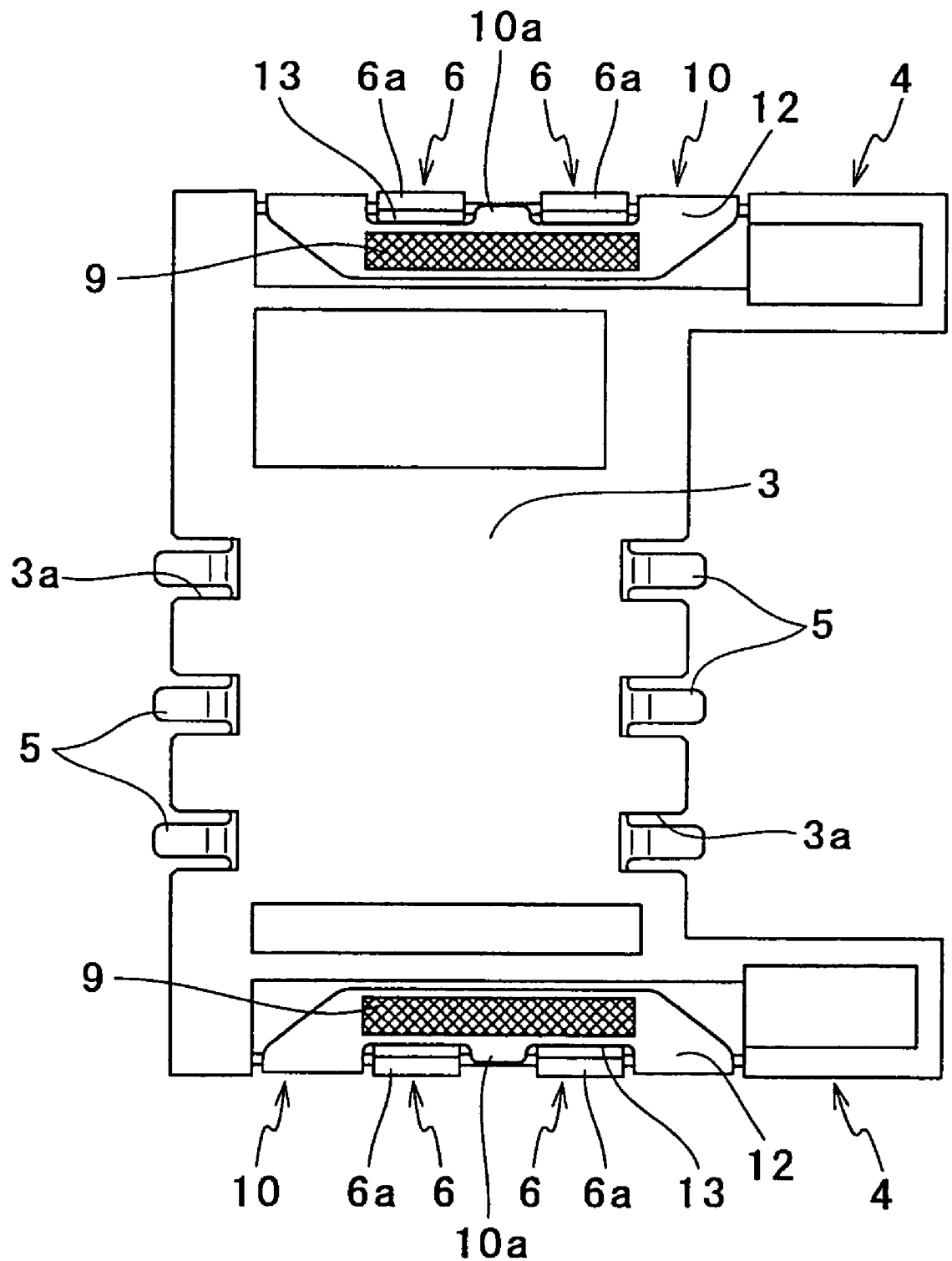
FIG. 5 is a back view of the memory card connector.

Referring now to FIG. 1 to FIG. 5, an embodiment of the present invention will be described. As shown in FIG. 1, a memory card connector according to the present embodiment is for detachably retaining a memory card 1 and connecting a terminal formed on a terminal surface 1a of the memory card 1 to a terminal on a substrate 21 in FIG. 2 so as to be capable of data exchange. As an example of the memory card 1, there is SIM (Subscribed Identification Module) card. However, it may be other information storage medium. The substrate 21 is installed on a mobile phone 22 or other information terminals or electrical equipment as shown in FIG. 2.

The aforementioned memory card connector includes a housing 2 formed of synthetic resin, and a metallic tab 10 provided on the housing 2 as shown in FIGS. 1, 3 through 5. The housing 2 includes a terminal surface abutting portion 3 to be abutted against the terminal surface 1a of the memory card 1, and guiding walls 4, 4 extending upward from the lateral ends of the terminal surface abutting portion 3 for positioning the memory card 1 in the lateral direction. The terminal surface abutting portion 3 includes a terminal retaining member 3a for retaining a relay terminal 5. The terminal retaining members 3a are formed at three positions in the lateral direction of the housing 2, and two sets of these three members are disposed at two positions at the front and rear in the longitudinal direction. Each guiding wall 4 includes a locking member 6 for retaining the tab 10, and a tab accommodating groove 7. The tab accommodating groove 7 is set to have a groove height, a groove length and a groove thickness corresponding to the height, length, and thickness of the tab 10. On the other hand, the locking members 6 are disposed side-by-side in the tab accommodating groove 7 at two positions in the longitudinal direction. The locking member 6 may be provided at one single position and at three or more positions.

On the other hand, the tab 10 includes an upright portion 11 which comes into surface abutment with the aforementioned tab accommodating groove 7 and supporting strips 12, 12 bent from the upper and lower ends of the upright portion 11. The distance between the supporting strips 12, 12 on the proximal side is set to the length corresponding to the groove height of the tab accommodating groove 7. The bent angle is preferably such that the width between both ends of the supporting strips 12, 12 is smaller than the width thereof on the proximal side. The both supporting strips 12, 12 have resiliency, and is adapted to be fitted so as to clamp the top and bottom of the guiding wall 4 of the housing 2 from the outside of the housing 2. One of the supporting strips 12 is adapted to push the lateral ends of the memory card 1 toward the terminal surface abutting portion 3. The end of the supporting strip 12 is inclined so as to be reduced in length from the proximal side to the free end so that the end of the memory card 1 can be inserted through the larger clearance on the proximal side of the supporting strip 12. In addition, the supporting strips 12, 12 are symmetrical top and bottom so that the tab 10 can be attached upside down.

The supporting strip 12 of the tab 10 located on the lower side of the guiding wall 4 is fixed to the substrate 21 by soldering at the outer surface thereof so that the memory card connector is firmly fixed to the substrate 21 in FIG. 2. Furthermore, the outer surface of each supporting strip 12 is formed with a mesh pattern 9. The mesh pattern 9 increases strength of fixation of the memory card connector to the substrate 21 by soldering by increasing the surface area of the outer surface of the supporting strip 12.

The tab 10 has a locking window 13 opening from the upper supporting strip 12 to the lower supporting strip 12. The locking window 13 has projections 10a formed in the opposite direction from the projecting direction of the supporting strips 12 at the center thereof. The locking window 13 is fitted to the locking members 6, 6 formed on each guiding wall 4 described above. Each locking member 6 is formed so that the top and bottom portions are situated upwardly of the upper supporting strip 12 and downwardly of the lower supporting strip 12 in the locking window 13. The locking member 6 prevents the tab 10 from dropping off the housing 2 by abutting on its top and bottom portions against the upper and lower supporting strips 12, 12, respectively. The locking member 6 is also projected outwardly from the tab accommodating groove 7 by an extent corresponding to the groove thickness, so as to support the tab 10 with the tab accommodating groove 7 in the horizontal direction (longitudinal direction of the guiding wall 4).

Furthermore, the locking member 6 includes bevels 6a inclining from the outer surface to the top and bottom portions. The bevels 6a facilitate the supporting strips 12, 12 of the tab 10 to open upward and downward along the bevels 6a. Provided between the locking members 6, 6 arranged in parallel are the projections 10a formed on the aforementioned supporting strips 12 on the side of the locking window 13. The projections 10a minimize lowering of the shape-retaining property of the supporting strips 12 by clamping the guiding wall 4 by the locking members 6, 6.

With the configuration descried above, a method of manufacturing the memory card connector will be described.

(Tab Manufacturing Process)

A band-shaped thin metal plate wound in a roll is set to an unwinding device. Then, the distal portion of the metal plate is unwound to a pressing machine. In this pressing machine, a pressing surface having a number of concavities and convexities is pressed against the metal plate, and hence the concavities and convexities of the pressing surface are transferred to the surface of the metal plate as the mesh pattern 9. The mesh pattern 9 stated here includes the one including a number of concavities and convexities formed thereon, the one in which a number of linear or curved fine lines are disposed in parallel, the one in which a number of fine lines of the forms described above are formed across each other, or the one having a combination of these concavities and convexities and the fine lines of the forms described above.

Subsequently, the outline of the tab 10 in the deployed state is punched out with a part of it remained so that the portion formed with the mesh pattern 9 corresponds to the supporting strips 12, 12. Then, after having punched out the locking window 13, the supporting strips 12, 12 are bent, so that the tab 10 is formed continuously at regular intervals on the metal plate. Subsequently, the tabs 10 are cut off from the metal plate so as to obtain single tab 10

(Housing and Relay Terminal Manufacturing Process)

A metal die having a cavity corresponding to the outline of the housing 2 is prepared. The metal die is set to an injection molding machine, and particles of synthetic resin material having insulating property are supplied to the injection molding machine, so that the housing 2 is manufactured. Also, a set of three relay terminals 5, 5, 5 arranged in parallel is formed by punching and bending the band-shaped thin metal plate by a pressing machine or the like.

(Assembly Process)

The tab 10, the housing 2, and the set of the relay terminal 5 manufactured in the respective processes described above are supplied to the part feeders respectively. Then, in the assembly process, the parts are supplied from the respective part feeders one by one in a predetermined posture to the operator. The operator first picks up the housing 2 using a gripping tool such as a pincer or the like. The housing 2 may be picked up by the operator's hand.

Subsequently, the tab 10 is picked up and the upper and lower supporting strips 12, 12 are moved toward the guiding wall 4 of the housing 2. The supporting strips 12, 12 reached the guiding wall 4 come into abutment respectively with the upper and lower bevels 6a, 6a formed on each locking member 6 on the guiding wall 4. When the tab 10 is pushed against the guiding wall 4, the supporting strips 12, 12 are deformed so as to open upward and downward along the bevels 6a, 6a, and move so as to clamp the guiding wall 4. Therefore, even when the clearance between the distal portions of the supporting strips 12, 12 is reduced due to an external force exerted while the tab 10 is stored or carried, the supporting strips 12, 12 can be moved so as to clamp the guiding wall 4 without problem.

Since the supporting strips 12, 12 have resiliency and are formed of thin metal plate, they are easily deformed and restored to their original state. Therefore, since the both supporting strips 12, 12 are opened and moved so as to clamp the guiding wall 4 simply by the operator pressing the tab 10 lightly toward the guiding wall 4 of the housing 2, the tab 10 can be attached to the housing 2 easily. Also, at this time, since the supporting strips 12, 12 are formed so as to be symmetrical top and bottom, the tab 10 can be attached upside down, and hence the tab 10 can be used for both left side and right side as a double-sided tab 10 without limitation. Therefore, mistake during operation of mounting the tab 10 can be avoided. In addition, the burden of the operator for paying attention to the mounting direction may be eliminated, and the process of paying attention to the mounting direction may also be eliminated.

When the upright portion 11 of the tab 10 comes into abutment with the tab accommodating groove 7 by pressing the tab 10 to the guiding wall 4, the top and bottom portion of the locking member 6 disposed in the tab accommodating groove 7 enter into the locking window 13. Accordingly, by the top and bottom portions of the locking member 6 coming into abutment with the upper and lower supporting strips 12, 12 respectively, the tab 10 is prevented from dropping off the housing 2. In addition, by the tab 10 being fitted into the tab accommodating groove 7, the tab 10 is prevented from being displaced in the horizontal direction along the guiding wall 4.

When the tabs 10, 10 are attached to the housing 2 in the manner described above, subsequently, a set of three relay terminals 5 arranged in parallel is picked up. The relay terminals 5, 5, 5 are fitted to the terminal retaining members 3a, 3a, 3a arranged in parallel in the lateral direction of the housing 2 respectively at one operation. Subsequently, a carrier, not shown, which connects the relay terminals 5, 5, 5 is broken off, and hence the respective relay terminals 5, 5, 5 are brought electrically into an independent state. By performing this fitting operation of the relay terminals 5, 5, 5 with respect to the front and rear terminal retaining member 3a, 3a, 3a the memory card connector is manufactured.

Subsequently, the operation of the memory card connector manufactured as described above will be described.

The memory card connector is first placed on the substrate 21 of the mobile phone 22 in FIG. 2 together with other electronic components. Then, the lower supporting strip 12 of the tab 10 is soldered to the substrate 21 together with the relay terminal 5. Accordingly, the memory card connector is brought into a state of being firmly fixed to the substrate 21.

Then, the memory card 1 is inserted between the guiding walls 4, 4 of the housing 2, and is inserted between the upper supporting strips 12 of the respective tabs 10 provided on lateral ends and the terminal surface abutting portion 3 of the housing 2. In this case, the ends of the respective supporting strips 12 are inclined so as to be reduced in length from the proximal side to the free ends. Therefore, the free ends of the supporting strips 12 come near the terminal surface abutting portion 3, whereby the memory card 1 can be inserted by inserting the end thereof through a larger clearance formed on the proximal side of the supporting strips 12 even when the distance between the free ends of the supporting strips 12 and the terminal surface abutting portion 3 of the housing 2 is smaller than the thickness of the memory card 1. Consequently, the memory card 1 can easily be attached to the memory card connector.

Also, since the memory card 1 is inserted so as to open the supporting strips 12 of the tab 10 from obliquely above the housing 2 when the memory card 1 is attached to the memory card connector, irregular forces in the vertical direction and horizontal direction are exerted to the memory card connector. These irregular forces serve as a separating force for separating the memory card connector from the substrate 21. However, the memory card connector is adhered to the substrate 21 by soldering at the supporting strips 12 of the tabs 10 as described above. In addition, the surfaces of the supporting strips 12 are increased in adhering area for soldering by the mesh patterns 9. Accordingly, since the memory card connector is firmly fixed to the substrate 21, even when a separating force is generated to some extent when inserting the memory card 1, the memory card connector is prevented from being separated from the substrate 21.

When the memory card 1 is inserted a manner described above, the upper supporting strips 12, 12 of the both tabs 10, 10 press the lateral ends of the memory card 1 toward the terminal surface abutting portion 3, whereby the memory card 1 is retained by the housing 2. Consequently, the terminal of the memory card 1 is stably connected to the terminal of the substrate 21 via the relay terminal 5, and personal information data such as telephone numbers are stored in the memory card 1. When upgrading the mobile phone 22 in FIG. 2 afterwards, the memory card 1 is pulled out from the memory card connector.

At this time, since the memory card 1 is pulled so as to open the supporting strips 12 of the tab 10 obliquely upward of the housing 2, irregular forces in the vertical and horizontal directions are exerted to the memory card connector. Then the irregular forces serve as a separating force for separating the memory card connector from the substrate 21. However, the memory card connector is adhered to the substrate 21 at the supporting strips 12 of the tab 10 by soldering as described above. In addition, the surfaces of the supporting strips 12 are increased in adhering area for soldering by the mesh pattern 9. Since the memory card connector is firmly fixed to the substrate 21, even when the separating force is generated to some extent when pulling out the memory card 1, the memory card connector is prevented from being separated from the substrate 21. Then the memory card 1 pulled out in this manner is connected to the memory card connector of the new mobile phone 22.

As described above, the memory card connector of the present embodiment is intended to detachably retain the memory card 1 and connect the terminal formed on the terminal surface 1a of the memory card 1 to the terminal on the substrate 21 so as to be capable of data exchange, and includes the housing 2 having the terminal surface abutting portion 3 to be abutted to the terminal surface 1a of the memory card 1, and the guiding walls 4, 4 extending upward from the lateral ends of the terminal surface abutting portion 3 for laterally positioning the memory card 1, and the tabs 10 having the resilient supporting strips 12, 12 on tops and bottoms and being attached to the respective guiding walls 4 by being fitted from the outside so as to clamp the tops and bottoms of the guiding walls 4, 4 by these supporting strips 12, 12 for pushing the lateral ends of the memory card 1 against the terminal surface abutting portion 3 by the supporting strips 12.

In this arrangement, when attaching the tab 10 by fitting it from the outside of the guiding wall 4, it is necessary to open the supporting strips 12 disposed on top and bottom of the tab 10 forcibly upward and downward by allowing them to abut against the guiding wall 4. However, since the supporting strips 12 have resiliency, an operator can fit the tab 10 easily to the state in which the supporting strips 12 clamp the guiding wall 4 by pushing the tab 10 by hand toward the guiding wall 4. Therefore, it is no longer necessary to use a jig which presses the tab 10 with a large force as in the case of fitting the same by forcibly deforming the housing 2 as in the related art. Accordingly, the production cost required for introducing the jig can be reduced, and the steps required for using the jig can be eliminated. As a consequence, the burden of the operator can be alleviated, and the production efficiency can be improved.

In the present embodiment, the ends of the supporting strips 12 are inclined from the proximal side to the free end so as to be reduced in length. In this arrangement, when attaching the memory card 1 to the memory card connector, the free ends of the supporting strips 12 come near the terminal surface abutting portion 3, whereby the memory card 1 can be inserted by inserting the end thereof through a larger clearance formed on the proximal side of the supporting strips 12 even when the distance between the free ends of the supporting strips 12 and the terminal surface abutting portion 3 of the housing 2 is smaller than the thickness of the memory card 1. Accordingly, the memory card 1 can easily be attached to the memory card connector.

In the present embodiment, the tab 10 is formed so that the supporting strips 12 are symmetrical top and bottom. In this arrangement, since the tab 10 can be attached upside down, handling of the tab 10 is facilitated, and the burden of the operator can further be alleviated.

In the present embodiment, the outer surfaces of the supporting strips 12 of the tab 10 positioned on the lower side of the guiding wall 4 are fixed to the substrate 21 by soldering. In this arrangement, the connector can be fixed firmly to the substrate 21.

In the present embodiment, the outer surfaces of the supporting strips 12 of the tab 10 are formed with the mesh patterns 9. In this arrangement, since the surface area of the outer surfaces of the supporting strip 12 can be increased by the mesh patterns 9, fixation of the connector with respect to the substrate 21 by soldering can further be strengthened.

In the present embodiment, since the tab 10 has the locking window 13 opening from the upper supporting strip 12 to the lower supporting strip 12, and the guiding wall 4 has the locking member 6 formed so that the top and bottom portions are situated upwardly of the upper supporting strip 12 and downwardly of the lower supporting strip 12 in the locking window 13, respectively. In this arrangement, the tab 10 is prevented from dropping off the housing 2 by the top and bottom portions of the locking member 6 being abutted against the upper and lower supporting strips 12 respectively.

The locking member 6 of the present embodiment includes bevels 6a inclined form the outer surface to the top and bottom portions thereof. Accordingly, since the supporting strips 12 of the tab 10 open along the bevels 6a, and hence the tab 10 can be attached to the housing 2 easily.

In the present embodiment, the locking members 6 are arranged side-by-side at a plurality of positions, and the supporting strips 12 are formed with projections 10a for clamping the guiding wall 4 between the locking members 6 on the sides of the locking window 13. In this arrangement, even when the shape-retaining property of the supporting strip 12 is lowered by the formation of the locking window 13, the lowering of the shape-retaining property can be minimized by clamping the top and bottom of the guiding wall 4 with the projection 10a.

Although the invention has been described based on the preferred embodiment, the present invention may be modified without departing from the scope of the invention. In other words, in the present embodiment, while the mesh patterns 9 are formed partly on the areas of the supporting strips 12, it may be formed entirely on the supporting strips 12, or may be formed entirely on the surfaces of the tabs 10. When the mesh patterns 9 are formed entirely on the supporting strips 12, the area for solder adhesion may further be increased. In contrast, when the mesh patterns 9 are formed entirely on the surfaces of the tabs 10, even when the positioning accuracy for punching process of the tabs 10 is lowered, normal tabs 10 can be formed at high yield.

In the process of manufacturing the tabs in the present embodiment, although the mesh patterns 9 are formed by pressing the pressing surface of the pressing machine against the metal plate, it is not limited thereto. In other words, the mesh patterns 9 may be formed by the mesh patterns formed on the peripheral surface of the transfer roll being transferred to the surface of the metal plate by the peripheral surface of the transfer roll being pressed against the metal plate. Also, the mesh patterns 9 may be formed by blowing fine particles on the surface of the metal plate.

Although the assembly process in the present embodiment, is performed according to the sequence of mounting the tabs 10 to the housing 2, and then attaching the relay terminals 5, it is not limited thereto, and the assembly process may also be performed in the sequence of attaching the relay terminals 5, and then attaching the tabs 10.

INDUSTRIAL APPLICABILITY

The memory card connector according to the present invention and the mobile phone provided therewith are configured as described above, and hence when fitting and attaching the tabs from the outside of the guiding walls, since the supporting strips have resiliency, the operator can easily fit to the state in which the supporting strips clamp the guiding walls by pushing the tabs toward the guiding walls by his/her hand. Therefore, it is not necessary to use the jig for pressing the tabs with a large force. Accordingly, the production cost required for introducing the jig can be reduced, and the process required for the operation using the jig can be eliminated. Consequently, the burden of the operator can be alleviated and the production efficiency can be effectively improved.

What is claimed is:

1. A memory card connector for detachably retaining a memory card and allowing a terminal formed on a terminal surface of the memory card to be connected to the terminal on a substrate so as to be capable of data exchange comprising:

a housing having a terminal surface abutting portion to be abutted to the terminal surface of the memory card and a guiding wall extending upward from a lateral end of the terminal surface abutting portion for laterally positioning the memory card; and a tab having an upper resilient supporting strip and a lower resilient supporting strip and attached to the guiding wall from the outside of the guiding wall, wherein the tab has a locking window opening from the upper supporting strip to the lower supporting strip, and wherein the guiding wall has at least one locking member configured to engage an upper edge portion and a lower edge portion of the locking window.

2. The memory card connector according to claim 1, wherein an end of at least one of the supporting strips decreases in width toward a free end of the tab.

3. The memory card connector according to claim 1, wherein the tab is formed so that the supporting strips are symmetrical top and bottom.

4. The memory card connector according to claim 1, wherein the at least one locking member is provided with bevels.

5. The memory card connector according to claim 1, wherein the at least one locking member are arranged side-by-side, and wherein a projection is disposed on the edge of the locking window and between adjacent locking members.

6. A mobile phone provided with the memory card connector according to claim 1.

7. The memory card connector according to claim 1, wherein an outer surface of at least one of the supporting strips is fixed to the substrate by soldering.

8. The memory card connector according to claim 7, wherein the outer surface of the at least one of the supporting strips is formed with mesh patterns.

* * * * *